Figure 1:
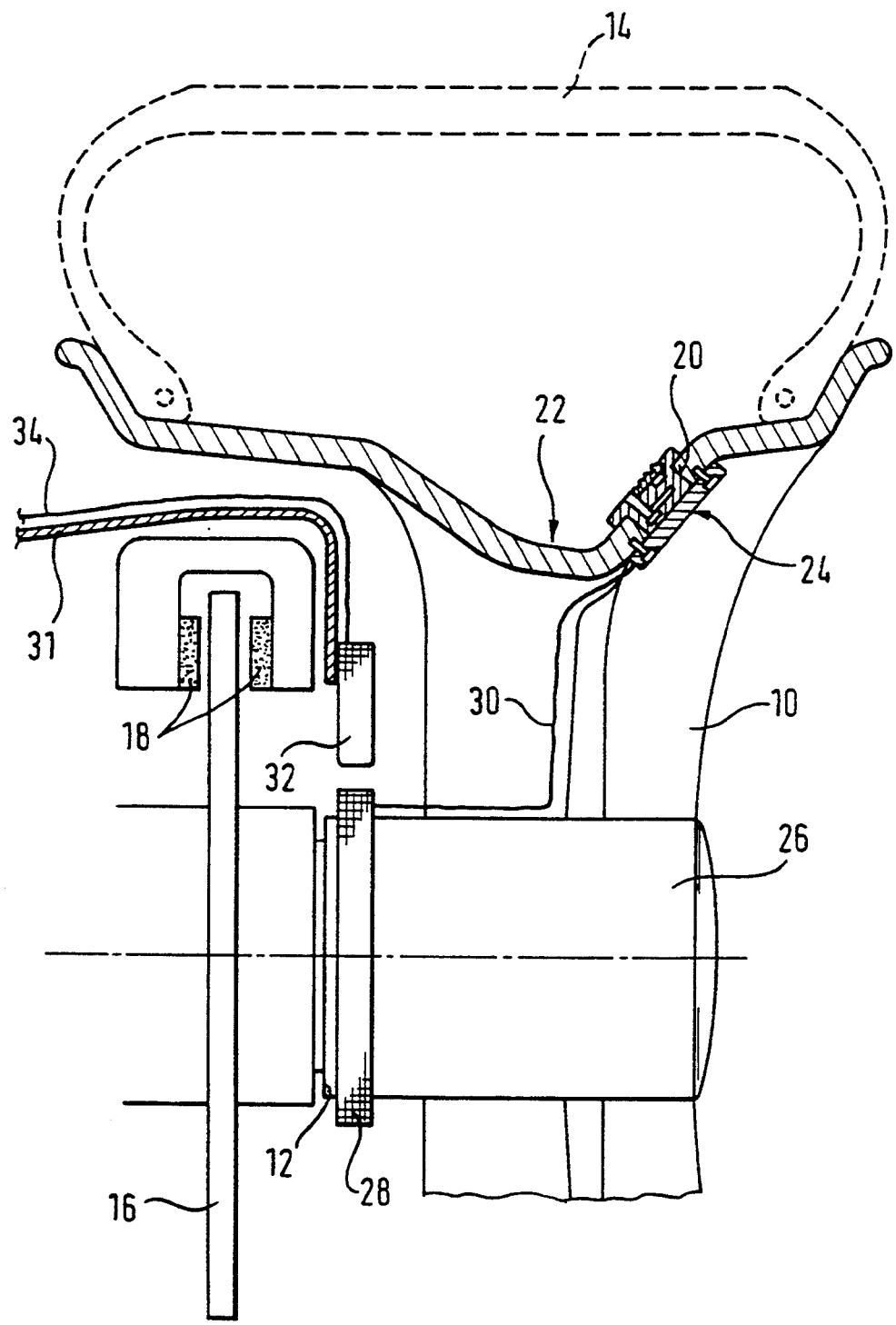

United States Patent [19]

Schurmann

[11] Patent Number: 5,353,020

[45] Date of Patent: Oct. 4, 1994

[54] ARRANGEMENT FOR MONITORING OPERATING PARAMETERS OF VEHICLE PNEUMATIC TIRES MOUNTED ON WHEEL RIMS

[75] Inventor: Josef Schurmann, Oberhummel, Fed. Rep. of Germany

[73] Assignee: Texas Instruments Incorporated, Dallas, Tex.

[21] Appl. No.: 818,182

[22] Filed: Jan. 8, 1992

[30] Foreign Application Priority Data

Jan. 9, 1991 [DE] Fed. Rep. of Germany ....... 4100442

[51] Int. Cl.$^5$ .................... B60C 23/04; B60C 23/20
[52] U.S. Cl. ..................... 340/870.31; 340/442; 340/448; 340/449
[58] Field of Search ............. 340/870.31, 870.32, 340/870.33, 442, 445, 448, 449

[56] References Cited

U.S. PATENT DOCUMENTS

| | | | |
|---|---|---|---|
| 4,954,677 | 9/1990 | Alberter et al. | 340/442 |
| 5,006,844 | 4/1991 | Ohta et al. | 340/448 |
| 5,181,423 | 1/1993 | Philipps et al. | 340/448 |

FOREIGN PATENT DOCUMENTS

| | | | |
|---|---|---|---|
| 3027059 | 2/1982 | Fed. Rep. of Germany | 340/448 |
| 2658759 | 8/1991 | France | 340/449 |

*Primary Examiner*—Donald J. Yusko
*Assistant Examiner*—John Giust
*Attorney, Agent, or Firm*—Rebecca A. Mapstone; James C. Kesterson; Richard L. Donaldson

[57] ABSTRACT

An arrangement for monitoring operating parameters of vehicle pneumatic tires mounted on wheel rims is provided with sensors (58, 60) for selected operating parameters and with transmitting means comprising rim-side mounted rotor members (28) and bodywork-side mounted stator members (32) coupled thereto for transmitting the operating parameters detected by the sensors (58, 60) to an evaluating arrangement in the vehicle connected to the stator members (32). In an opening (20) of the wheel rim (10) in the region of the rim well (22) a measuring module (24) comprising two components (36, 38) detachably connected together is disposed. One of the components (36, 38) is mounted on the side facing the tire (14) and the other is mounted on the side of the rim well (22) remote from the tire (14). The sensors (58, 60) are mounted on one of the two components (36). The other component (38) is electrically connected to the rotor members (28) and the signals furnished by the sensors (58, 69) and representing operating parameters are transmitted by inductive coupling to a pickup (68) in the component (38) lying on the side of the rim well (22) remote from the tire (14).

9 Claims, 2 Drawing Sheets

ARRANGEMENT FOR MONITORING OPERATING PARAMETERS OF VEHICLE PNEUMATIC TIRES MOUNTED ON WHEEL RIMS

The invention relates to an arrangement for monitoring operating parameters of vehicle pneumatic tires mounted on wheel rims comprising sensors for selected operating parameters and transmitting means comprising rim-side mounted rotor members and bodywork-side stator members coupled thereto for transmitting the operating parameters detected by the sensors to an evaluating arrangement in the vehicle connected to the stator members.

An arrangement of this type is known from DE-A-3,029,563. In this arrangement, between the sensors detecting the operating parameters of the pneumatic tires and the rim-side mounted rotor members a galvanic connection is present which can be separated via plug contacts. Even with high-quality construction of the plug connection it cannot be ensured that satisfactory signal transmission always takes place when it is remembered that the location of the monitoring arrangement exposes it to extremely unfavorable ambient conditions. Moisture and dirt, possibly with extremely corrosive substances such as deicing salt, act on the plug connection and consequently the quality of the connection considered over a relatively long period of time becomes increasingly poor. If however the operating parameters monitored are to be employed to give the driver information on the tire state, then dangerous situations can arise if the tire state, for example by pressure loss, requires that the vehicle be stopped but the monitoring arrangement, due to the poor transmission quality of the sensor signals via the plug connection, cannot report this dangerous state to the driver. In such a case the driver would drive on with unreduced speed because he will rely on the full functionality of the monitoring arrangement installed in his vehicle.

The invention is based on the problem of further developing an arrangement of the type mentioned at the beginning in such a manner that it also operates with great reliability for long periods of time even under extremely unfavourable use conditions.

This problem is solved according to the invention in that in an opening of the wheel rim in the region of the rim well a measuring module is disposed which comprises two components which are detachably connected together, one of which lies on the side facing the tire and the other on the side of the rim well remote from the tire, that the sensors are mounted on the one component, that the other component is electrically connected to the rotor members and that signals furnished by the sensors and representing the operating parameters are transmitted by inductive coupling to a pickup in the component lying on the side of the rim well remote from the tire.

In the arrangement according to the invention in the transmission connection between the sensors and the rotor members no contact means of transmission quality which can be impaired by external influences or mechanical stresses are present. The signal transmission thus takes place solely in inductive manner, that is contactless, and consequently the transmission quality remains unchanged even after long operating periods. Furthermore, the use of the inductive coupling also opens up the possibility of influencing the transmitted signals for example as regards their signal strength and also of matching impedances of the electrical circuit components participating.

A further development permits monitoring of the tire pressure and by additional provision of a temperature sensor the dependence of the tire pressure on the temperature of the air in the tire interior can be taken into account. It is possible in this manner to indicate to the driver of a vehicle equipped with the arrangement according to the invention the maximum speed at which he can safely travel with the pressure present in the tire.

Another further development of the arrangement according to the invention permits temperature compensation of the pressure sensor because this further temperature sensor detects the temperature the pressure sensor itself is at. Due to its particular position this temperature sensor detects the temperature of the rim because it is disposed in the immediate vicinity of the pressure sensor and thus also near the rim. It is possible to determine in this manner whether an increase in the air temperature in the tire interior is due to heating from the outside caused for example by frequent braking. In driving operation in which frequent braking is necessary the rim is heated by the brake so that consequently the air temperature in the tire interior is also increased by the increased rim temperature. By comparing the temperature rise indicated by the two temperature sensors it is possible to distinguish between whether the temperature rise is due to frequent braking or due to a high vehicle speed. Depending on the findings made different algorithms can then be used to evaluate the detected parameters so that at any time the driver can be provided with a reliable display taking account of the particular travelling state.

Figures 2, 3:
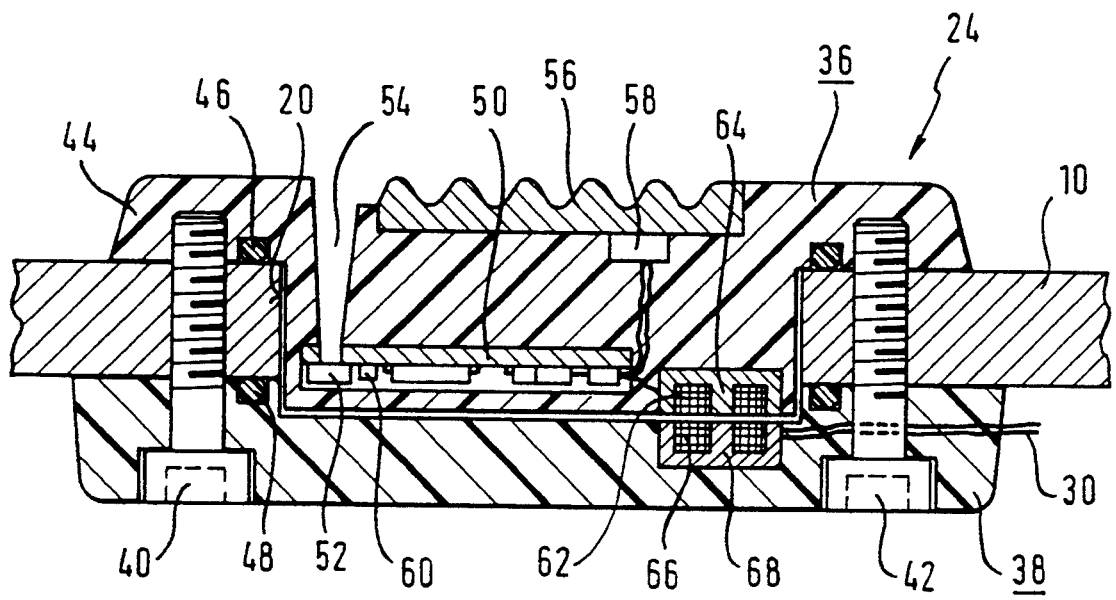

The invention will now be explained by way of example with the aid of the drawings, wherein:

FIG. 1 is a schematic sectional view of a rim which is fitted to a wheel axle and on which the arrangement according to the invention is mounted, FIG. 2 shows a first example of embodiment of the measuring module attached to the wheel rim and FIG. 3 shows a further embodiment of the measuring module attached to the rim.

In FIG. 1 part of a wheel rim 10 mounted on the axle 12 of a vehicle is illustrated. A schematically indicated pneumatic tire 14 is mounted on the wheel rim 10. Also apparent in FIG. 1 is a brake disc 16 having associated brake pads 18.

A measuring module 24 is disposed in an opening 20 of the wheel rim 10 in the region of the rim well 22. The hub 26 of the wheel rim 10 is surrounded in the inwardly disposed region by an annular coil 28 which via a wire line 30 is in connection with the measuring module 24.

Associated with the annular coil 28 is a coupling coil 32 which is fixedly connected to a bodywork part 31 and which via a wire line 34 is connected to evaluating electronics, not shown. Via the annular coil 28 and the associated coupling coil 32 signals coming from the measuring module 24 can be transmitted to the evaluating electronics.

An example of embodiment of the measuring module 24 is shown in FIG. 2. As can be seen, the measuring module 24 is made up of two components 36 and 38. The component 36 is mounted on the side of the well rim 22 facing the tire 14 whilst the component 38 is mounted on the side remote from the tire 14. The component 36 is made from a hard plastic material which has a relatively low thermal conductivity. The component 38 also consists of such a material. The components 36 and 38 are screwed together with the aid of threaded bolts 40, 42, an edge flange 44 of the component 36 bearing on the region of the rim well inner surface surrounding the opening 20 in the wheel rim 10. To increase the sealing effect, a seal 46, 48 respectively is provided both between the component 24 and the inwardly directed surface of the rim well 22 and between the component 38 and the outwardly directed surface of the rim well 22. With this arrangement of the two components and their mounting on the wheel rim 10 the air pressure obtaining in the tire interior intensifies the sealing effect because the component 36 is pressed against the inner surface of the rim well 22 more as the air pressure increases.

Arranged in the component 36 is a carrier plate 50 which lies substantially on the side of the component 36 remote from the tire 14. Mounted on said carrier plate 50 is a pressure sensor 52 which is in connection with the tire interior via a passage 54 disposed in the component 36. As can be seen, the passage 54 tapers from the tire interior in the direction towards the pressure sensor 52. This configuration of the passage 54 ensures that ice which might form in the passage 54 on slight heating and resulting expansion can easily be dissolved out of the passage 54 so that the pressure measurement is not obstructed.

A metal plate 56 ribbed at its upper side to increase its area is inserted into the surface of the component 36 facing the tire 14. In contact with this metal plate is a temperature sensor 58 which measures the temperature of the metal plate 56 and supplies the result to the electronic circuit disposed on the carrier plate 50. Since the component 36 consists of plastic of poor thermal conductivity the temperature of the metal plate 56 corresponds substantially to the temperature of the air in the tire. Disposed on the carrier plate 50 in the immediate vicinity of the pressure sensor 52 is a further temperature sensor 60 which measures the temperature to which the pressure sensor 52 is exposed. One reason for using a temperature sensor 60 resides in providing temperature compensation for the pressure values measured by the pressure sensor 52. Inaccuracies in the pressure measurement caused by different temperatures of the pressure sensor 52 can be eliminated in this manner. As will be explained below, the temperature sensor 60 is also used for another purpose.

The signals generated by the electronic circuit on the carrier plate 50 and representing the detected pressure and temperature values are supplied to a coupling coil 62 accommodated in a ferrite core 64 which is formed by half of a pot core. Associated as pickup with this coupling coil 62 in the component 38 is a further coupling coil 66 which is likewise disposed in a ferrite core 68 formed by a pot core half. Via the wire line 30 the coupling coil 66 in the ferrite core 68 is in connection with the annular coil 28 via which the signals can be transmitted from the measuring module 24 with the aid of the coupling coil 32 to the evaluating electronics in the vehicle.

Due to the inductive coupling via the coupling coils 62 and 66 no mechanical contacts are necessary for establishing the connection between the electronic circuit in the component 36 and the annular coil 28 on the rim hub 26. The measuring module 24 can thus be easily mounted and removed without having to separate mechanical contacts which could be soiled or damaged and thus impair the signals transmitted.

The use of the coupling coils 62, 66 is particularly favourable when the signal transmission is carried out using HF carrier frequency technique. The coupling coil 62 may be employed as coil of a resonant circuit of high Q to which the coupling coil 66, which is of low impedance, can be loosely coupled. The necessary impedance transformation is obtained by the two coupling coils 62 and 66.

The combination of a circuit having high Q and a low impedance coupling coil loosely coupled to the circuit permits a mechanically uncritical arrangement which in practical use operates reliably in spite of any mechanical production or installation tolerances which may be present.

To provide the driver of a vehicle equipped with the arrangement described reliably and safely with information on the particular possible safe maximum velocity with the currently present tire operating parameters it is not enough to detect only the tire pressure with the aid of the pressure sensor 52 and supply it to the evaluating electronics. Detection of the temperature in the tire interior with the aid of the temperature sensor 58 itself contributes to improving safety because with the aid of the detection of the air temperature in the tire interior it is also possible to take into account the case where the vehicle has been moved with high speed for a relatively long period of time so that the tire temperature has greatly increased. This tire temperature increase occurs in particular with high load of the vehicle. If both the pressure in the tire and the air temperature in the tire are detected the safe maximum speed can be calculated taking account of these two measured values. It is however also possible for the air in the interior of the tire to be greatly heated without high travelling speed being present; this occurs in driving operation where frequent braking is necessary, the brakes heating up and the braking heat being transmitted via the wheel rim to the tire. To enable a distinction to be made between these two states (heating due to high vehicle speed and heating due to frequent braking) the evaluating electronics is also supplied with the temperature measured by the temperature sensor 60.

Due to the specific arrangement of the two temperature sensors 58 and 60 the latter respond to the operating conditions outlined above in different manners so that the desired distinction is possible. If the increase in the air temperature in the interior of the tire is due to a high vehicle speed the temperature sensor 58 reacts to this temperature increase first because it measures directly the temperature of the plate 56 in contact with the air in the tire 14. The fact that the temperature rise is first detected by the temperature sensor 58 can be utilized by the evaluating electronics to apply a specific algorithm to calculate the maximum safe speed to be indicated to the driver.

If on the other hand the temperature increase in the interior is due to the braking heat generated by frequent braking first heating the rim, which then transmits the heat to the air in the tire, then the temperature sensor 60, since it lies substantially nearer the rim, will respond first to the temperature increase brought about via the rim. The evaluating electronics in the vehicle can then recognize that it is not a high vehicle speed which is the cause of the temperature increase of the air in the tire 14 but frequent braking. The electronics can therefore apply another algorithm to calculate the safe maximum speed. If the same algorithm were applied as in the previously explained case the evaluating electronics would indicate a wrong safe maximum speed to the driver because on the basis of the measured temperature and pressure the electronics would have to assume that operation with high vehicle speed had led to the pressure and temperature increase in the tire 14.

In FIG. 3 a further embodiment of the measuring module 24 is illustrated which differs from the measuring module according to FIG. 2 only in that the two components are screwed together from the rim well inner side. Apart from this difference the two embodiments are completely identical and consequently the same reference numerals have also been used for corresponding parts.

I claim:

1. An arrangement for monitoring the operating parameters of vehicle pneumatic tires, mounted on rotor members of the vehicle, including wheel rims which have rim wells and openings in the rim wells, and the vehicle pneumatic tires rotated about stator members of the vehicle, and having interiors comprising:
    sensors for detecting selected operating parameters and providing said operating parameters to electronic circuitry;
    the electronic circuitry for receiving said operating parameters and generating signals representative of said operating parameters and providing said signals to transmitting means;
    the transmitting means for transmitting said signals representative of said operating parameters to an evaluating arrangement in said vehicle, and comprising rim-side mounted rotor members and bodywork-side stator members coupled thereto;
    a measuring module, which lies within an opening in a rim well of a wheel rim, and comprises a first and a second component, which are detachably connected together, wherein said first component is disposed facing the tire and said second component is disposed remote from the tire on the rim well; and
    wherein said sensors and said electronic circuitry are mounted on said first component and said second component is electrically connected to said rim-side mounted rotor members, and wherein further said signals representative of said operating parameters are coupled from said first component by inductive coupling to said second component.

2. An arrangement according to claim 1, wherein, for inductive coupling of said signals representative of said operating parameters, in each case a ferrite core with a coupling coil is installed in each of said first and second components of said measuring module and that the two coupling coils are loosely coupled together.

3. An arrangement according to claim 2, wherein the coupling coil is part of a resonant circuit of high Q and low impedance.

4. An arrangement according to claim 2, wherein each ferrite core is formed by one-half of a pot-core and that the pot core halves are so installed in an opposing relationship with a predetermined air gap between the opposing pot core halves for obtaining the loose coupling.

5. An arrangement according to claim 1, wherein said first component, disposed on the side of the rim well facing the tire, has an edge flange with which it bears on the region of the rim well inner surface surrounding the opening in the rim well and clamps a seal inserted therebetween.

6. An arrangement according to claim 1, wherein the operating parameters to be monitored are the pressure and the temperature in the tire, and wherein further on said first component, a pressure sensor and at least one temperature sensor are mounted, and the temperature sensor is so arranged that it responds to the temperature of the air in the tire.

7. An arrangement according to claim 6, wherein said first component comprises a carrier plate which is mounted on a side of said second component and carries said pressure sensor, and that a passage in said first component establishes a connection between said pressure sensor and the tire interior.

8. An arrangement according to claim 7, wherein said passage establishing a connection between the pressure sensor and said tire interior tapers conically towards said pressure sensor.

9. An arrangement according to claim 7, wherein a second temperature sensor is arranged on the carrier plate in the immediate vicinity of said pressure sensor.

* * * * *